July 3, 1962

L. C. FRIEND 3,041,733

GAUGING APPARATUS PARTICULARLY ADAPTED
FOR MEASUREMENT OF SMALL CHANGES
IN DIMENSIONS OR DISPLACEMENTS
Filed Feb. 18, 1959

INVENTOR

LINDSAY C. FRIEND

BY K. G. Doub

ATTORNEY

3,041,733
GAUGING APPARATUS PARTICULARLY ADAPTED FOR MEASUREMENT OF SMALL CHANGES IN DIMENSIONS OR DISPLACEMENTS
Lindsay C. Friend, Baltimore, Md., assignor to The Bendix Corporation, a corporation of Delaware
Filed Feb. 18, 1959, Ser. No. 794,086
5 Claims. (Cl. 33—149)

The gauging apparatus of the present invention incorporates certain features of advantage which fulfill a much-needed want in the gauge industry, among which are the following:

It is capable of sensing exceedingly small displacements or changes in dimensions and visually indicating such changes in easily readable form directly on the scale of a suitably calibrated read-out gauge, such as a manometer, without requiring the use of amplifiers or other auxiliary equipment;

It is accurate, simple and reliable to a degree not usually found in prior known apparatus for performing a similar function;

It has long-term stability and does not require frequent or elaborate recalibration;

The ratio between the smallest readable increment of change in dimensions or displacement of the article being gauged and the total range of such change can be made relatively great;

It can be rendered insensitive to temperature effects over an exceedingly wide range; also it can be made relatively small and compact. One advantage of these two factors is to enable the apparatus to be placed in temperature chambers of varying sizes along with a sample of the material to be tested, a procedure not usually possible with gauges of this general type.

The foregoing and other objects and advantages will become apparent in view of the following description taken in conjunction with the drawing, wherein.

Figure 1:
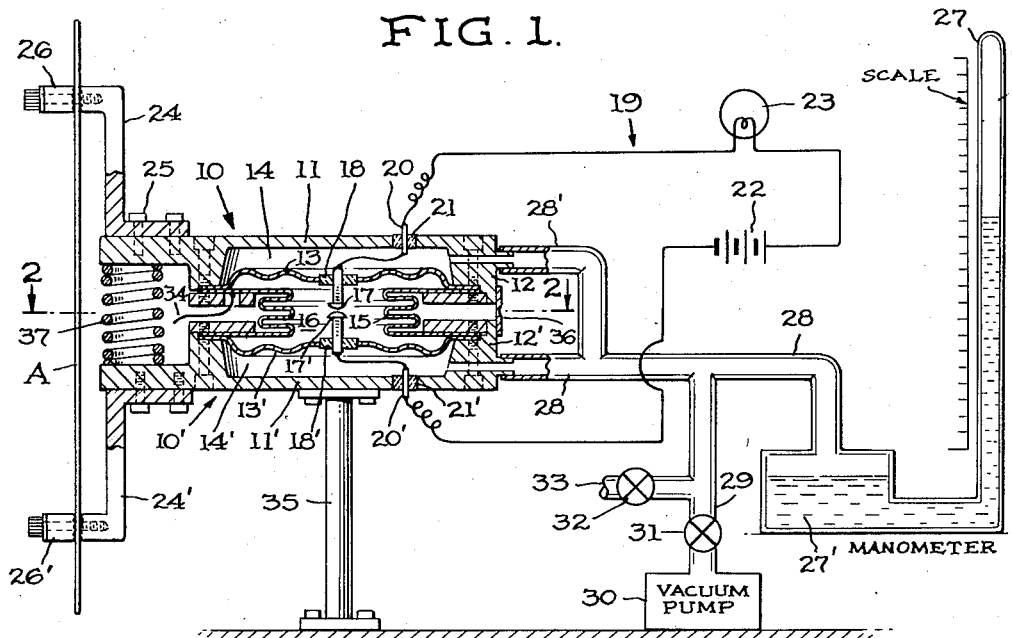
FIG. 1 illustrates the improved sensing device in sectional elevation coupled with a manometer-type of read-out system and associated electric signal circuit, which is shown schematically.
Figure 2:
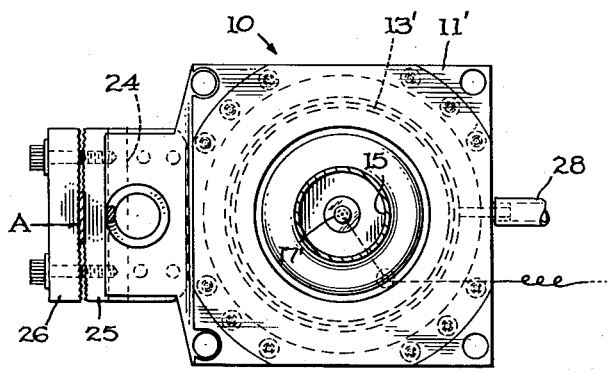
FIG. 2 is a section taken substantially on the line 2—2 of FIG. 1.

Referring to the drawing in detail, a pair of relatively bodily movable chambered members are generally indicated at 10 and 10'; they are identical in construction and the parts thereof are identified with similar reference numerals except that a prime (') has been added to the numerals of the lower member. Each of said members comprises a backing plate 11 or 11', formed with an annular flange 12 or 12', having a movable wall such as a diaphragm 13 or 13' secured at its peripheral edge thereto, the plate and diaphragm defining a chamber 14 or 14', closed and sealed except where it communicates with a fluid pressure gauge system in a manner to be described.

A resilient bellows section 15 is interposed between the members 10, 10'; it has outturned end flanges which are secured to the flanges of the upper and lower backing plates 11, 11', the said bellows section together with said diaphragm defining a closed and sealed intermediate chamber 16. Located in this intermediate chamber are a pair of electrical contacts 17, 17' having electrodes which project through glass seals 18, 18', fused to the central portion of each diaphragm. An electric signal circuit, generally indicated at 19, has terminals 20, 20' projecting through sealed insulators 21, 21' in the upper and lower backing plates, and these terminals are electrically connected to the electrodes for the contacts 17, 17'. The circuit 19 may be energized from any suitable source of potential, shown here as a battery 22, and includes a signal lamp 23, which functions to indicate when a gauge reading should be taken immediately preceding and following a gauging operation in a manner hereinafter rendered apparent.

In the example shown in the drawing, the material to be tested is a length of sheet metal, indicated at A, which is supported by a pair of holding brackets or arms 24, 24', secured at their inner ends to the upper and lower plates 11, 11' as by bolts 25 and at their outer ends terminating in right-angle extensions adapted to receive clamping blocks 26, 26'.

The visual read-out device in the example shown comprises a manometer tube 27, having a hollow base or well 27', which is in pressure communication with the chambers 14, 14' by means of a fluid pressure system made up of a conduit 28, having a branch 28'. Another conduit 29 communicates a suitable pressure source, here a vacuum pump 30, with the conduit 28. A valve 31, located in the conduit 29, provides means whereby the pressure in the system may be selectively adjusted. Another valve 32, located in conduit 33, serves as a means for venting the system to the atmosphere or to a positive or auxiliary pressure source, as found necessary or desirable. The small tube indicated at 34 may be used for evacuating and back-filling the chamber 16 to compensate for changes in temperature in a manner to be described.

The sensing chamber members 10 are shown mounted on a pedestal 35. They could, however, be supported in any suitable manner or they may be unconnected to any particular supporting means so that the entire unit can be hand-carried to any suitable location.

When used for testing material as in the example shown, the upper and lower units are hinged together as at 36, and a spring 37 tends to move the said units apart and hold the strip A taut between the arms 24.

Operation

Since the system is sealed against the entrance of atmospheric air or other fluid pressure, any variaion in pressure due to opening of valves 31 and/or 32 will displace the diaphragms 13, 13' and the column of fluid in the manometer tube 27 proportionally. If it be assumed that the chamber 16 has been substantially evacuated, or is of such low value as to result in a high differential across the diaphragms 13, 13', bodily movement of the upper and/or lower members or units 10, 10' will cause substantially no deflection of the diaphragms 13, 13', and the latter along with the contacts 17, 17' will move in unison with said members. However, even though the pressure in chamber 16 is such as to cause the diaphragms 13, 13' to deflect when the upper and lower members 10, 10' are moved bodily, the column of fluid in the manometer tube 27 will also be displaced proportionally, so that the accuracy of the gauge is not disturbed. Hence the manometer tube can be calibrated in a linear scale, such as microinches, indicating the relative movement or travel of the members 10 and 10' (and consequently the material gripping arms carried thereby) toward and from one another. Obviously, however, other types of indicators could be utilized, as for example a dial gage having pressure-responsive drive mechanism.

In the following example of a gauging operation or test, it will be assumed that the chamber 16 is substantially evacuated, that the article to be tested consists of a strip of sheet metal such as that indicated at A, and that it is desired to obtain the coefficient of expansion and/or contraction of the strip over a temperature range starting with 64° F. and dropping down to —40° F. With the strip securely clamped to the outer ends of the arms 24, 24' and held taut by the spring 37, the pressure in the conduit 28 and diaphragm chambers 14, 14' is adjusted to a point where the contacts 17, 17' close and cause illumination of the lamp 23, at which time a reading is taken on the manometer scale at the top level of the mercury column. With the valves 31 and 32 closed, the temperature in the test chamber or other enclosure in which the gauge may be located is then lowered to −40° F. and sufficient time is permitted to elapse to permit the strip to stabilize at the lower temperature. During this period, the upper arm 24 will move towards the lower arm 24′ as the strip contracts. If the contacts 17, 17′ are permitted to remain closed, the diaphragms 13, 13′ will gradually depress and displace the liquid gauge column upwardly, in which event the second reading should be taken by adjusting the pressure in the system until the contacts break and the lamp 23 is extinguished. It is preferred, however, to adjust the system pressure so that the contacts close for the first reading at the start of the test, then open the contacts, and after the strip A has stabilized at the higher temperature, adjust the system pressure until the contacts close for the second reading. The difference between the first and second readings will be the exact linear contraction of the strip as a result of the 104° temperature change.

In the event it is desired to start the test at the low end of the temperature range with the strip stabilized at the low temperature, the valve 31 or 32 would be adjusted until the contacts 17, 17′ close and illuminate the lamp 23, at which time a reading should be taken of the manometer gauge. As the temperature increases, arm 24 will move away from the arm 24′; and when the strip stabilizes at the higher temperature, valve 32 is opened until the contacts 17, 17′ again close and illuminate the lamp 23. At this time another reading is taken of the manometer scale. The difference between the first and second readings will show the linear expansion of the metal strip.

In brief, the operation may be summarized as follows: Relative displacement of the members 10, 10′ causes the diaphragms to move therewith or proportionally to such displacement. When the signal contacts are closed (or opened) following displacement, the system pressure at which this occurs is proportional to such displacement.

With respect to temperature compensation, this may be necessary to preserve the high degree of accuracy of the gauge in the event it is found that the temperature characteristics of the plates 11, 11′ are such that changes in temperature (which are sometimes considerable) affect the position of the diaphragms 13, 13′. This could of course be avoided by utilizing material for the members 10, 10′ and associated parts which would be unaffected by temperature changes, but such materials may not be available, or may not have the desired characteristics for proper fabrication of the gauge parts. Assuming that the plates 11, 11′ are made of material which does expand and contract with changes in temperature, then by evacuating the chamber 16 and back-filling to obtain a predetermined differential across the diaphragms 13, 13′ substantially complete temperature compensation may be obtained.

The fluid displacement part of the system can be readily gauged to make the ratio of travel of the manometer column with respect to proportional relative movement of the units 10, 10′ (and consequently the gripping arms carried thereby) relatively great, so that the slightest movement of said arms towards or away from one another will result in a substantial displacement of the manometer column. The device may be made small and compact so that it may be easily hand-carried to different locations and disposed in restricted areas, should space be at a premium. All movable parts may be made rugged and durable so as not to be susceptible to instability as the result of handling or usage, there being no delicate parts such as are found in certain other highly precise measuring instruments.

In certain instances only one chamber 14 may be utilized, in which event the lower contact would remain fixed. Also, instead of mounting the contacts 17, 17′ on the diaphragms 13, 13′, separate flexible mounting elements could be utilized as long as the contacts are responsive to pressure generated in the system. However, by locating the contacts in the intermediate chamber 16, they are protected from contamination and oxidation. Other changes and modifications will become apparent to those skilled in the art once the basic concept of the invention has become known.

What is claimed is:

1. In gauging apparatus of the class specified, a pair of chambered members adapted to be relatively bodily displaced in proportion to variations in displacement or dimensions of the article being gauged, the chambers defined by said members being provided with oppositely-disposed flexible diaphragms;
   a flexible wall connecting said members and together with said diaphragms defining an intermediate chamber sealed at a predetermined pressure;
   a fluid pressure conduit in communication with said member chambers;
   a read-out gauge provided with movable indicating means responsive to displacement of the fluid in said conduit and said member chambers;
   an electric signal system provided with a signal for visually indicating when a gauge reading should be taken preceding and following the gauging operation including a pair of electrical contacts carried by said diaphragms and projecting into said intermediate chamber;
   and means for selectively adjusting the pressure in said conduit and member chambers.

2. In gauging apparatus of the class specified, a pair of chambered members adapted to be relatively bodily displaced in proportion to variations in displacement or dimensions of the article being gauged, the chambers defined by said members being provided with oppositely disposed flexible diaphragms;
   a flexible wall connecting said members and together with said diaphragms defining an intermediate chamber;
   a fluid pressure conduit in communication with said said pair of chambers;
   a read-out manometer-type gauge provided with a scale calibrated in terms of linear motion and a fluid column responsive to displacement of the fluid in said conduit and said member chambers;
   an electric signal system provided with a signal for visually indicating when a gauge reading should be taken preceding and following the gauging operation including a pair of electrical contacts carried by said diaphragms and projecting into said intermediate chamber;
   and means for selectively adjusting the pressure in said conduit and pair of chambers.

3. In gauging apparatus of the class specified, a pair of chambered members adapted to be relatively bodily displaced in proportion to variations in displacement or dimensions of the article being gauged, the chambers defined by said members being provided with oppositely disposed flexible diaphragms;
   a flexible wall such as a bellows section connected at its opposite ends to said members and together with said diaphragms defining an intermediate chamber sealed at a predetermined pressure;
   a fluid pressure conduit including a manometer type read-out gauge provided with a liquid column adapted to be displaced in response to displacement of fluid in said conduit member chambers;
   an electrical signal system provided with a signal for visually indicating when a gauge reading should be taken preceding and following the gauging operation including a pair of electrical contacts carried by said diaphragms and projecting into said intermediate chamber;
   and means for selectively adjusting the pressure in said conduit and member chambers.

4. A device for measuring small changes in length of an object comprising first and second chambered members adapted to be relatively physically displaced in proportion to variations in length of the object being measured, each of said members including mounting means for attaching and supporting said object;

resilient means urging said members apart;

first and second flexible diaphragms whose displacement is a function of the pressure drop thereacross attached to said first and second chambered members respectively thereby defining first and second pressure sensing chambers;

a flexible wall connecting said members and together defining an intermediate chamber sealed at a predetermined pressure;

a pressure responsive gauge including interconnecting large area and small area liquid containing chambers;

means producing variable gas pressures interconnecting said large area chamber and said first and second chambers; and electrical indicating means including a pair of contacts attached to said diaphragms and projecting into said intermediate chamber responsive to movement of said diaphragms for indicating the displacement thereof, whereby changes in the height of the liquid in said small area chamber varying with the pressure required to cause an output from said indicating means are proportioned to changes in the length of said object between said mounting means.

5. A device for measuring small changes in length of an object comprising first and second chambered members adapted for relative movement, each of said members including a mounting means for attaching and supporting said object;

resilient means urging said first and second members apart;

movable wall means whose displacement is a function of the pressure drop thereacross attached to one of said members and cooperating therewith to form a first chamber;

resilient sealing means connected between said members and cooperating with one of said members and with said movable wall means to form a second chamber;

a pressure responsive gauge including interconnecting large area and small area liquid containing chambers;

means producing variable gas pressures interconnecting said large area chamber and said first chamber; and electrical indicating means attached to said movable wall means and responsive to movement thereof for indicating its displacement, whereby changes in the height of the liquid in said small area chamber varying with the pressure required to cause an output from said indicating means are proportional to changes in the length of said object between said mounting means.

References Cited in the file of this patent

UNITED STATES PATENTS

| | | |
|---|---|---|
| 1,375,385 | Guillery | Apr. 19, 1921 |
| 1,950,107 | Guinn et al. | Mar. 6, 1934 |
| 2,399,305 | Agnew et al. | Apr. 30, 1946 |
| 2,567,519 | Livingston | Sept. 11, 1951 |
| 2,655,037 | Gess | Oct. 13, 1953 |
| 2,681,566 | Ruge | June 22, 1954 |
| 2,715,339 | Honig | Aug. 16, 1955 |